(12) United States Patent
Zornow (10) Patent No.: US 9,021,353 B2
(45) Date of Patent: Apr. 28, 2015

(54) SYSTEMS AND METHODS FOR CAMOUFLAGING AN INFORMATION STREAM

(76) Inventor: Jonathan Zornow, New York, NY (US)

(*) Notice: Subject to any disclaimer, the term of this patent is extended or adjusted under 35 U.S.C. 154(b) by 576 days.

(21) Appl. No.: 13/298,128

(22) Filed: Nov. 16, 2011

(65) Prior Publication Data

US 2013/0124982 A1 May 16, 2013

(51) Int. Cl.
G06F 17/00 (2006.01)
G06F 3/14 (2006.01)
G06F 17/30 (2006.01)
G09G 5/00 (2006.01)

(52) U.S. Cl.
CPC ............ *G06F 3/14* (2013.01); *G06F 17/30126* (2013.01); *G09G 5/00* (2013.01); *G09G 2358/00* (2013.01); *G09G 2370/022* (2013.01)

(58) Field of Classification Search
CPC ................... G06F 17/30126; G06F 17/30716; G06F 17/30867
USPC .......... 715/200, 221, 226, 243, 253, 273, 277
See application file for complete search history.

(56) References Cited

U.S. PATENT DOCUMENTS

| | | | |
|---|---|---|---|
| 2001/0020243 A1* | 9/2001 | Koppolu et al. .............. | 707/513 |
| 2001/0044798 A1* | 11/2001 | Nagral et al. ................. | 707/102 |
| 2003/0004957 A1* | 1/2003 | Broman et al. ............... | 707/100 |
| 2003/0065637 A1* | 4/2003 | Glasgow ........................... | 707/1 |
| 2003/0126136 A1* | 7/2003 | Omoigui ......................... | 707/10 |
| 2004/0006743 A1* | 1/2004 | Oikawa et al. ................ | 715/513 |
| 2004/0070622 A1* | 4/2004 | Cossey et al. ................. | 345/769 |
| 2004/0250215 A1* | 12/2004 | Chen et al. .................... | 715/769 |
| 2004/0260535 A1* | 12/2004 | Chen et al. ........................ | 704/9 |

* cited by examiner

*Primary Examiner* — Stephen Hong
*Assistant Examiner* — Gregory J Vaughn
(74) *Attorney, Agent, or Firm* — David R. Conklin; Kirton McConkie (57) ABSTRACT

Information is camouflaged to permit discreet access of the information at times when it is otherwise inappropriate to access the information. Information is camouflaged for computer device display by analyzing visual characteristics of baseline information designated to be displayed on a portion of an electronic display and causing the electronic display to display replacement information within a region of the electronic display in place of information or content that would normally be displayed within the region. The replacement information visually conforms to the visual characteristics so as to be camouflaged within other information displayed outside the region. An input/output interface may be at least intermittently displayed within a section of the region to permit a user to interact with a data stream providing the replacement information. When the input/output interface is displayed, it may also be camouflaged to conform to the visual characteristics of the baseline information.

16 Claims, 10 Drawing Sheets

70 {
Jon Zornow: i think jeremy's roommates are in the city with a car

Jon Zornow: i was going to try to catch a ride with them

Dave Zornow: ah, good plan!

Dave Zornow: any idea of when you plan to be in the 'burbs?

Jon Zornow: I think mom said they were coming out at three

74 →

72 {
Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

*FIG. 8*

74 — Jon Zornow: i think jeremy's roommates are in the city with a car

→ Jon Zornow: i was going to try to catch a ride with them

70 — Dave Zornow: ah, good plan!

Dave Zornow: any idea of when you plan to be in the 'burbs?

Jon Zornow: I think mom said they were coming out at three

72 — uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on

*FIG. 9*

SYSTEMS AND METHODS FOR CAMOUFLAGING AN INFORMATION STREAM

BACKGROUND OF THE INVENTION

1. Field of the Invention

The present invention relates to the display of information streams, and more particularly to the camouflaging of information streams in situations where a standard display of the information stream is undesirable.

2. Background and Related Art

The advent of networks including wide-area networks such as the Internet has greatly facilitated the exchange of information between various electronic and computer devices and systems. In recent years, accessibility of such information has increased and expanded, including through the use of various types of wireless connections, such that access to information from a variety of sources, including over the Internet, can be readily achieved in a wide variety of situations.

The information that can be accessed over a network includes a wide variety of static and dynamic content. For example, static content may include web pages from any of a variety of sources. The web pages may be updated from time to time, but the content of many such pages is passive and not interactive, and is comparatively stable with information remaining static in between periodic updates or changes. In contrast, dynamic content and information may be provided by other sites and/or systems. For example, dynamic content may be provided by way of information streams, including audio, video, and/or textual streams. In some instances, such content may be interactive and/or may be formed in real time through participation by one or more participants. Comment threads, instant messaging applications, and strings of text messages are all common examples of interactive content. Access to such content may be provided by any of a variety of programs, including browser programs, multimedia programs, dedicated messaging programs, and the like. Such programs may be provided using any of a variety of access devices, including desktop, laptop, and tablet computer devices, smart phones, PDAs, electronic readers, and the like.

Younger generations have grown up with such programs and devices and are familiar with near-constant accessibility to the information in which they are interested. Many users wish to have essentially constant access to and participation in information access and exchange using the available systems and programs. For example, some cell phone users may exchange many thousands of text messages monthly. Other users wish to have an instant messaging program open at all times so they can communicate with their friends. The integration of computer devices into workplaces and classrooms has fueled users' desires to remain connected to their information sources at all times.

Unfortunately, it is not always possible or socially acceptable to access and/or participate in certain information sources at all times. In many classrooms, for example, it is frowned upon if the students are participating in chats with their friends during class. In some classrooms where student use of laptops is commonplace, for example, schools have placed minors at the backs of classrooms so teachers can view which students are using their computers for non-class purposes. Similarly, in many workplaces, it may be unacceptable or at least viewed as unprofessional for employees to access certain information streams or to participate in chats facilitated by instant messaging services or the like. Even if the users are able to multitask and satisfactorily complete their work assignments, class work, or the like, the mere appearance of having divided attention may be undesirable to the user.

There are many situations where a user may wish to access an information source or information stream, but where such access may be deemed socially or otherwise unacceptable. For example, a college student may wish to access a social networking site, such as Facebook, to check for updates during a lecture, but might not want the other students sitting behind him or a teacher to observe him slacking off in class. Similarly, an employee of a company could want to communicate with friends during work hours, but not want to leave his instant messaging window open for observation. A journalist might desire to record observations or communicate with someone in an environment where outside communication is restricted or frowned upon. Thus, users encounter significant difficulties that may prevent them from accessing and participating in information streams in ways the information streams are normally accessed and used.

BRIEF SUMMARY OF THE INVENTION

Implementation of the invention provides systems, methods, and computer-readable media storing computer instructions for implementing methods for camouflaging information for display by an electronic display. A method for camouflaging information includes automatically analyzing visual characteristics of baseline information designated to be displayed on a portion of the electronic display and causing the electronic display to display replacement information within a region of the electronic display in place of information that would normally be displayed within the region, the replacement information visually conforming to the visual characteristics so as to be camouflaged within other information displayed outside the region.

Before being displayed, the replacement information is formatted to visually conform to the visual characteristics. This formatting may include formatting replacement textual information to visually conform to textual portions of the baseline information. Such formatting may include formatting at least one textual element such as font type and size, font color, line height, margins and padding, and textual decoration including bold text, italics, underlines, strikethroughs, shadows, superscripts and subscripts, and the like. In some instances, formatting the replacement information may include removing a portion of the replacement information, such as an image, a line break, or text formatting of text of the replacement information. In some instances, formatting the replacement information may include altering visual characteristics of an image portion of the replacement information.

In certain instances, the replacement information replaces a portion of the baseline information within the region. In other instances, the replacement information is displayed within the region adjacent to the baseline information outside the region.

An input/output interface may be at least intermittently displayed within a section of the region to permit a user of the computer device to interact with one of the replacement information and a source of the replacement information. The input/output interface may be provided, for example, upon receipt of a selection of the region from the user, such as using a touch screen or any other pointing device. When the input/output interface is displayed, it may be camouflaged to conform to the visual characteristics of the baseline information.

The user may designate the region in which the replacement information is to be displayed. The user may also designate an extent to which the replacement information is to be visually conformed to the visual characteristics of the baseline information, wherein the replacement information is conformed to the visual characteristics of the baseline information to the extent designated by the user.

In certain instances, the electronic display may be caused to display a blend of the replacement information and the baseline information. For example, the electronic display may blend textual information of the replacement information with graphical information from the baseline information.

The replacement information may include information obtained from a real-time data stream delivered to the computer device over a network. Such information may include a single data stream, or it may include a composite data stream formed by combining multiple independent data streams. The replacement information may thus be updated in real time based upon changes in the data stream. By providing the input/output interface within a section of the region, the user may be permitted to interact with and add information to the data stream.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention address the problem of providing discreet access to information in situations where it may normally not be socially acceptable to access the information. Thus, embodiments of the invention provide systems, methods, and computer-readable media storing computer instructions for implementing methods for camouflaging information for display by an electronic display. A method for camouflaging information includes automatically analyzing visual characteristics of baseline information designated to be displayed on a portion of the electronic display and causing the electronic display to display replacement information within a region of the electronic display in place of information that would normally be displayed within the region, the replacement information visually conforming to the visual characteristics so as to be camouflaged within other information displayed outside the region.

Before being displayed, the replacement information is formatted to visually conform to the visual characteristics. This formatting may include formatting replacement textual information to visually conform to textual portions of the baseline information. Such formatting may include formatting at least one textual element such as font type and size, font color, line height, margins and padding, and textual decoration including bold text, italics, underlines, strikethroughs, shadows, superscripts and subscripts, and the like. In some instances, formatting the replacement information may include removing a portion of the replacement information, such as an image, a line break, or text formatting of text of the replacement information. In some instances, formatting the replacement information may include altering visual characteristics of an image portion of the replacement information.

In certain instances, the replacement information replaces a portion of the baseline information within the region. In other instances, the replacement information is displayed within the region adjacent to the baseline information outside the region.

An input/output interface may be at least intermittently displayed within a section of the region to permit a user of the computer device to interact with one of the replacement information and a source of the replacement information. The input/output interface may be provided, for example, upon receipt of a selection of the region from the user, such as using a touch screen or any other pointing device. When the input/output interface is displayed, it may be camouflaged to conform to the visual characteristics of the baseline information.

The user may designate the region in which the replacement information is to be displayed. The user may also designate an extent to which the replacement information is to be visually conformed to the visual characteristics of the baseline information, wherein the replacement information is conformed to the visual characteristics of the baseline information to the extent designated by the user. Alternatively, the program or system may automatically determine a placement and size of the region in which the replacement information is to be displayed and may default to a default extent to which the replacement information is to be visually conformed to the visual characteristics of the baseline information.

In certain instances, the electronic display may be caused to display a blend of the replacement information and the baseline information. For example, the electronic display may blend textual information of the replacement information with graphical information from the baseline information.

The replacement information may include information obtained from a real-time data stream delivered to the computer device over a network. Such information may include a single data stream, or it may include a composite data stream formed by combining multiple independent data streams. The replacement information may thus be updated in real time based upon changes in the data stream. By providing the input/output interface within a section of the region, the user may be permitted to interact with and add information to the data stream.

Figure 1:
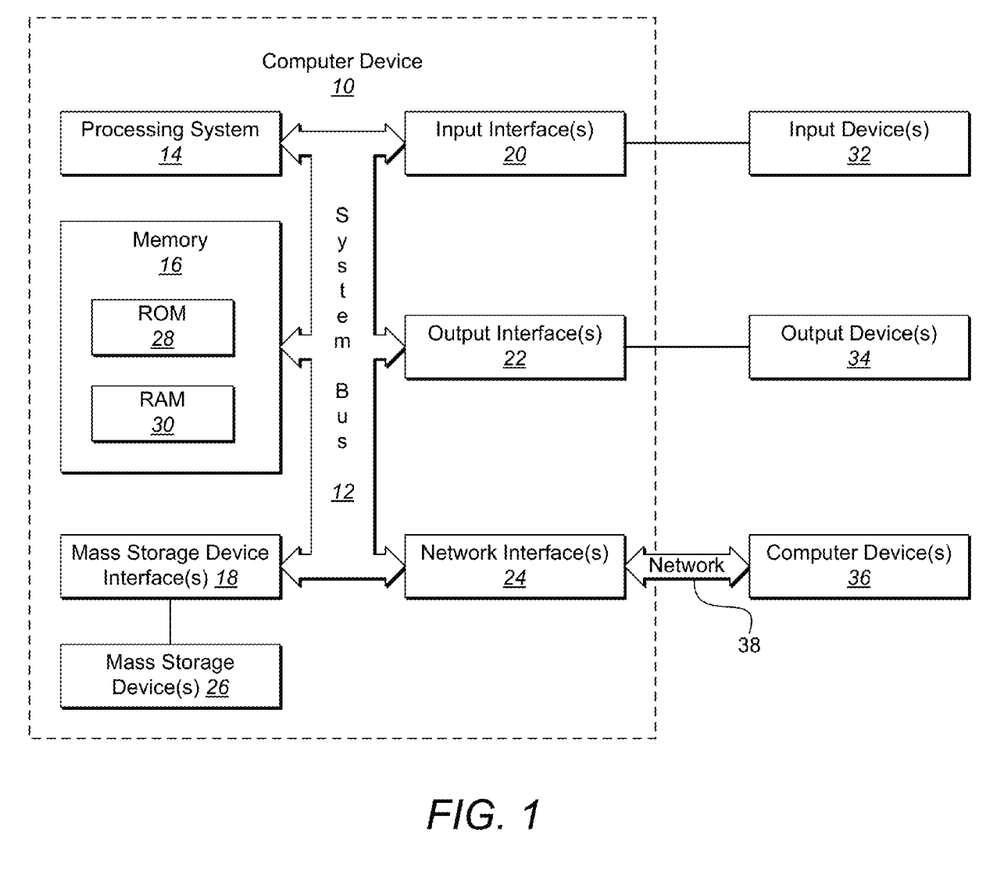
FIG. 1 shows a representative computer system suitable for use with embodiments of the invention.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook computer, a netbook, a tablet computer such as the iPad® manufactured by Apple or any of a variety of Andriod™-based tablet computers produced by multiple manufacturers, a personal digital assistant ("PDA") or other hand-held device, a Smartphone device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a solid-state drive, a flash drive, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include solid-state drives, flash drives, hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, touch screen, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a Firewire® (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen or other electronic display, a speaker, a printer, a multi-functional peripheral, and the like. A particular output device 34 may be integrated with or peripheral to computer device 10. Examples of output interfaces include a video adapter, an audio adapter, a parallel port, and the like. Examples of electronic displays include monitors, televisions, e-ink displays, projection displays, or any other display capable of displaying changing information under the control of a computer device.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, such as a cloud-based computer environment, where functions or tasks are performed by a plurality of networked computer devices.

Figure 2:
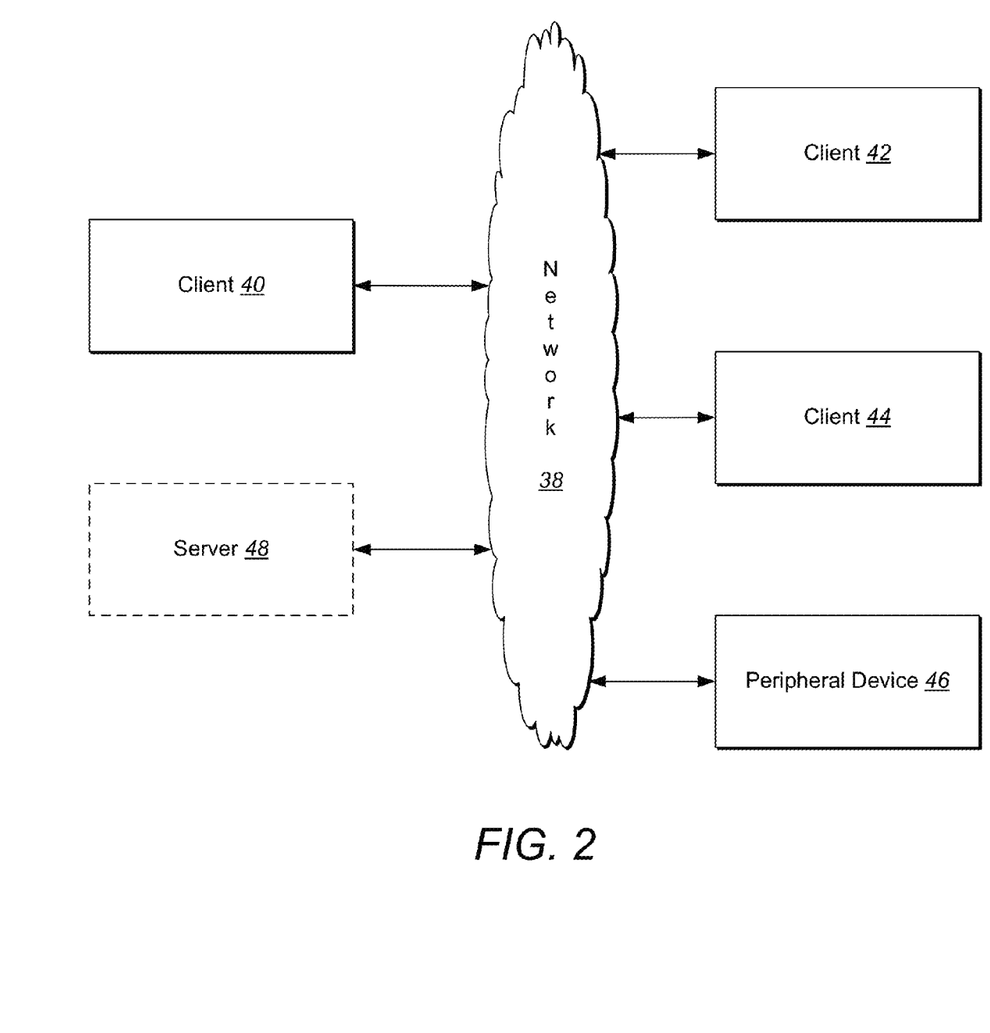
FIG. 2 shows a representative networked computer system suitable for use with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Figure 3:
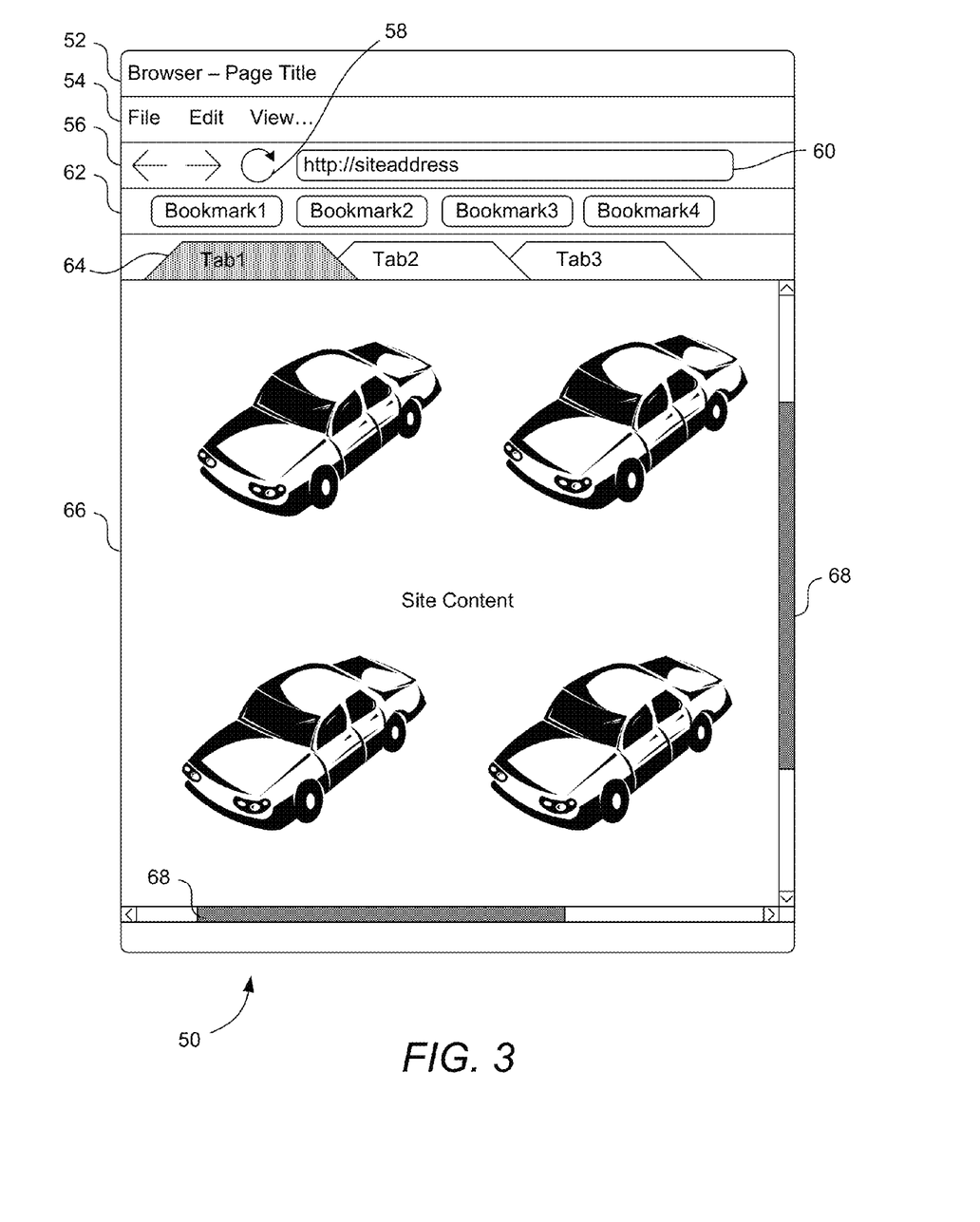
FIG. 3 shows a representative web browser screen.

At least some embodiments of the invention utilize or utilize in part existing web browser technology. Many browser programs currently exist or are under development, and it would be impossible to name all such browser programs, but examples of such programs include Microsoft's Internet Explorer, Mozilla Firefox, Google Chrome, Apple Safari, Opera Software's Opera browser, as well as myriad browsers specifically configured for specific devices, such as Internet-connected smart phones and the like. While the exact display of each browser can vary from browser to browser and while most are moderately to highly configurable so as to vary the exact display, FIG. 3 shows a representative browser window 50 similar to what might be displayed at one time or another on a user's computer device. It will be appreciated that many of the features described below with respect to the illustrated browser window 50 are optional or are optionally displayed or hidden as desired by the user, but each feature is typical or illustrative of features common to many browser programs.

The browser window 50 of FIG. 3 includes a title bar 52. The title bar 52 often is used to display a page name of whatever page is actively being viewed. Most commonly, the page name that is displayed is selected by the administrator of the website being viewed, and the page name often includes one or more phrases associated with the administrator of the website and/or the page being viewed. The browser window 50 also includes a menu bar 54 that includes items that may be selected to provide access to various menu functions, as is well known in the art. Of course, the menu functions provided in the menu bar 54 may vary according to the specific browser program, among other considerations, and access to menu functions may be provide other than by a menu bar similar to menu bar 54.

The browser window 50 of FIG. 3 also includes an address bar 56, which in the browser window 50 shown in FIG. 3 includes several browser controls 58 and an address entry area 60. The browser controls 58 and the address entry area 60 facilitate browsing using the window, permitting the user, for example, to go back one or more pages, to go forward one or more pages, to refresh a page, and/or to type in a destination site's address to directly access a page. Such browser features are well known in the art and need not be further discussed.

The browser window 50 also includes a bookmark bar 62 that a user can populate with bookmarks to commonly-accessed web pages, such that the user can quickly re-access the page(s) by clicking on the relevant bookmark button. In most common browser programs, it is possible for the user to have several different websites open simultaneously, and for the browser to provide rapid access, switching between, and management of the various open sites by way of various tabs 64, as shown in FIG. 3. Each tab 64 provides access to one open website. The tabs 64 facilitate navigation between different open web sites. The contents of each open and actively-viewed website may be displayed in a content area 66. Thus, the content displayed in the content area 66 may vary depending on which tab 64 is selected, and which website is being viewed.

Whereas the tabs facilitate navigating between different websites, the browser window 50 optionally includes features to facilitate navigating within a website, as is known in the art. Specifically, the browser window may optionally include one or more scroll bars 68. When a portion of the website being viewed lies outside of the viewable portion of the content area 66, the user may use the scroll bars 68 to access non-visible portions, as is known in the art.

Many currently-available browser programs permit the installation of additional features, such as through what are commonly known as "browser extensions." Browser extensions are becoming more and more common in today's browser programs, and have become one of if not the standard for extending the functionality of the browser programs. For browsers that do not currently support browser extensions, other mechanisms and installed programs are often available to provide similar functionality. A browser extension in accordance with embodiments of the invention may be provided and installed according to any now-known or later-developed methods. A browser extension may be used to provide at least a portion of the functionality discussed herein in at least some embodiments.

While at least some embodiments of the invention utilize or utilize in part a browser program or browser window to provide at least some of the functionality discussed herein, the functionality discussed herein may be provided by or in conjunction with a variety of other programs. As non-limiting examples, such other programs include note-taking programs, word processing programs, spreadsheet programs, and any of a variety of other programs where incorporation of the functionality discussed herein to camouflage information is feasible and may result in satisfactory camouflaging of the information. As will be appreciated by those familiar with such programs, each such program includes different program controls, menus, control bars, and the like, and it would be impossible to discuss the features of every such program in detail. It will suffice to note that many of such features are generally similar to the features illustrated with respect to the representative browser window illustrated and discussed with respect to FIG. 3 and to note that such features are generally well known in the art. Many of the programs with which functionality according to embodiments of the invention may be incorporated include a content area similar to the content area 66 shown in FIG. 3, and embodiments of the invention utilize all or a portion of such content area.

By way of example, FIGS. 4-7 show representative displays of content, or a portion thereof, that might be displayed in the content area 66 of the browser window 50. For purposes of clarity of illustration, the browser window 50 itself is not shown in these Figures. The content shown in these FIGS. 4-7 is typical of content that might be displayed at one time or another by a browser, and it should be understood that such content is merely illustrative: where information is to be camouflaged within other types of programs, the information displayed may be very different.

Figure 4:
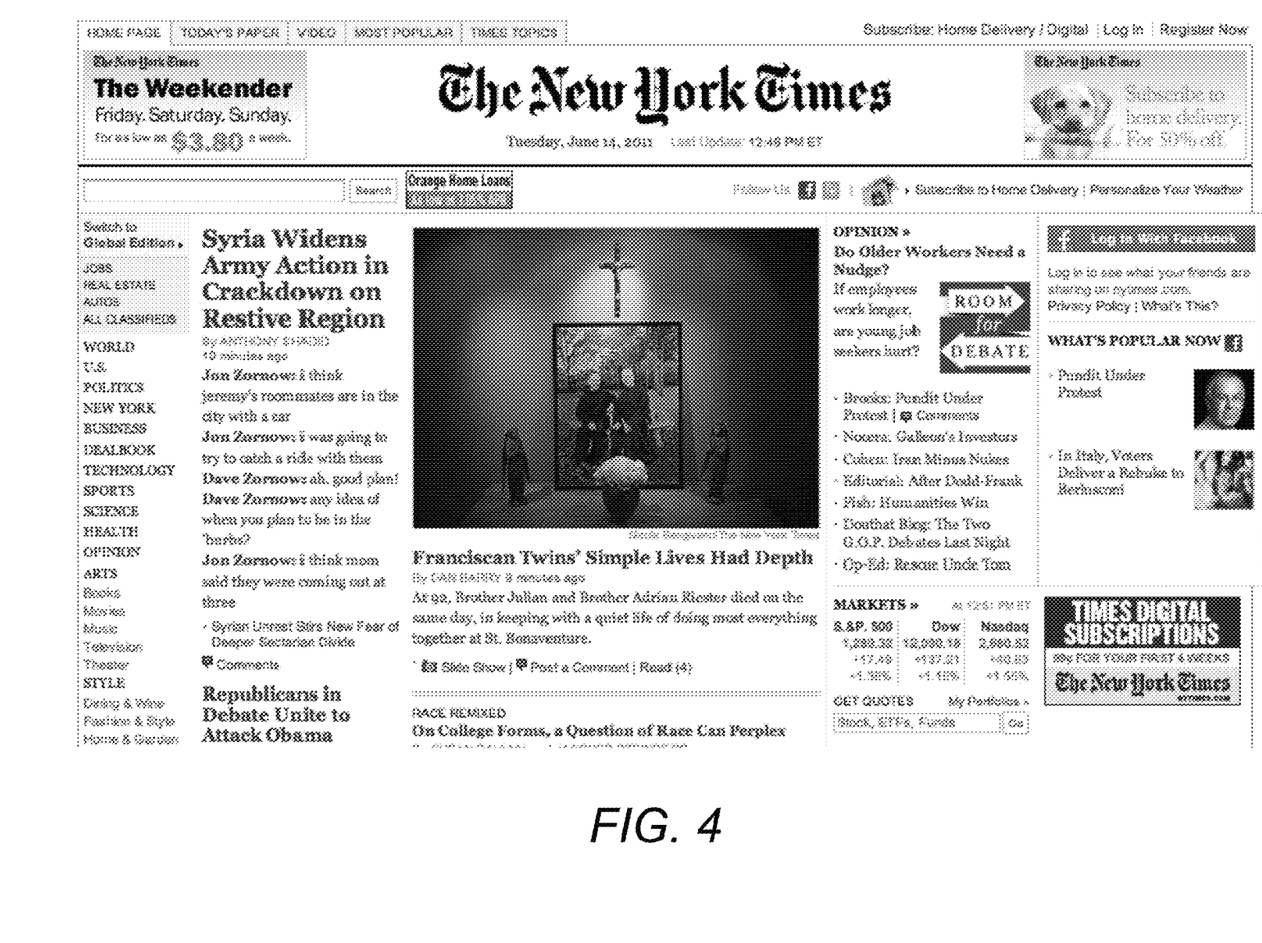
FIG. 4 shows a representative view of information that might be displayed within a content area of a computer program window such as a content area of a web browser screen.
Figure 5:
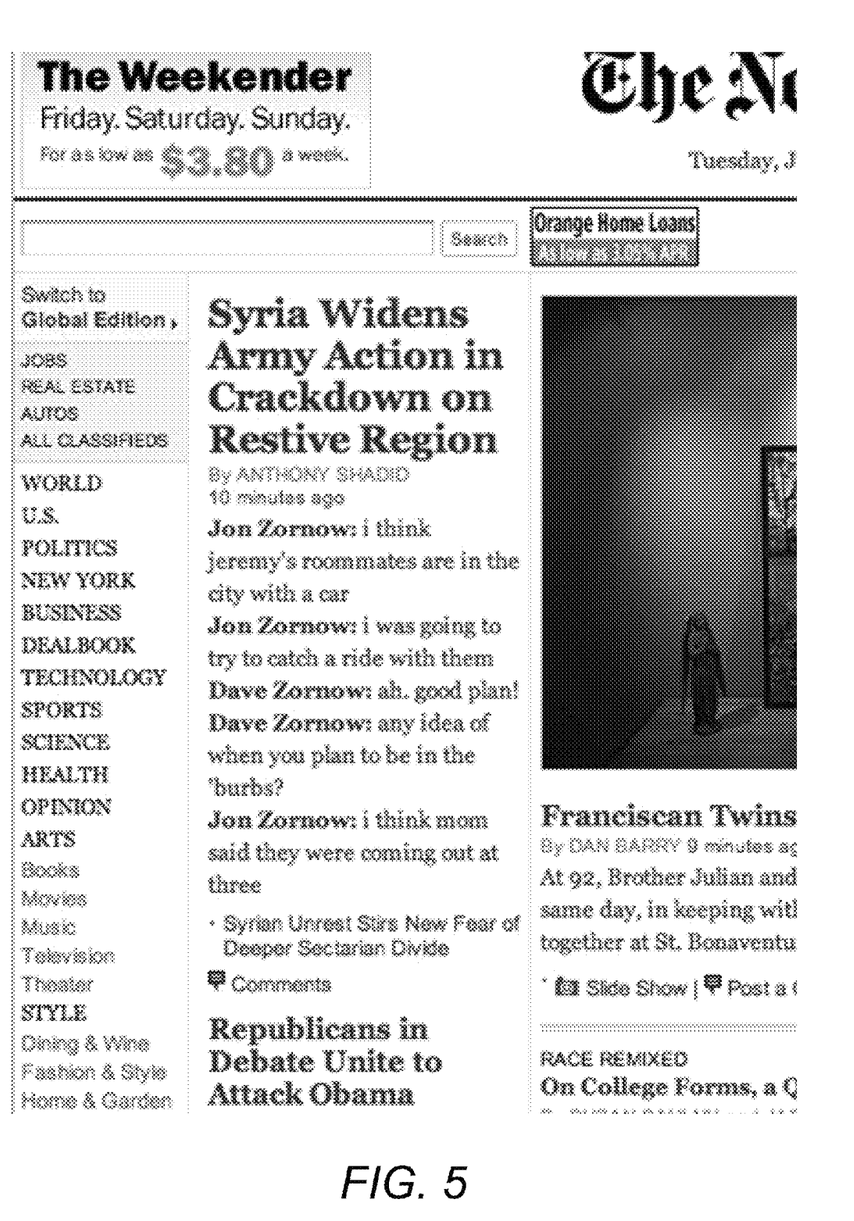
FIG. 5 shows a close-up view of a portion of FIG. 4.

As shown in FIGS. 4-7, the content displayed in the content area 66 may be representative of content accessed from, for example, a news media source. As shown in FIG. 4, the content displayed in the browser window 50 appears to be, in its entirety, the normal content provided by the news media source. However, closer inspection of the "article" toward the left of the display, as shown in greater detail in FIG. 5, shows that a portion of the content is not the actual content provided by the news media source. Instead, the body of the article underneath the headline includes replacement information that has replaced baseline information or content normally provided by the news media source. Specifically, the replacement information includes a portion of a chat.

Surrounding the displayed portion of the chat, the baseline information provided by the news media source remains unchanged: the other articles displayed are the actual baseline content provided by the news media source. The unchanged baseline content includes the header of the news media source, advertisements, several other articles, market tickers, links to additional content, and the like. The unchanged baseline information occupies a significant amount of the content area 66. Thus, casual inspection of the user's computer device and the display thereof does not immediately give away the presence of the replacement information. Instead, the replacement information is camouflaged within its region of display with the baseline information outside of its region of display.

While the term "replacement information" has been used to describe the information displayed in the region shown in FIG. 5, it should be recognized that the replacement information need not necessarily replace the baseline information. In some instances, the replacement information may simply replace unused whitespace of the content area 66. In other instances, the replacement information may displace a portion of the baseline information such that the displaced information is displayed elsewhere. In other instances, the replacement information does replace at least a portion of the baseline information. Thus, the term "replacement information" is not necessarily limited to situations where the replacement information actually replaces baseline information that would otherwise be displayed.

As may be seen in FIGS. 4 and 5, the replacement information is displayed so as to visually conform to visual characteristics of a portion of the baseline information. The replacement information may visually conform to visual characteristics of a portion of the baseline information being replaced, or it may visually conform to visual characteristics of an adjacent portion of the baseline information. In the specific instance shown in FIGS. 4 and 5, the replacement information visually conforms to the visual characteristics of a portion of the baseline information that has been replaced, specifically the body of the article underneath the headline. According to various embodiments of the invention, the replacement information may be formatted in varying ways and to varying extents along a continuum of possible formatting to enhance the camouflage effect and/or to facilitate consumption of the replacement information. Thus when replacement information "visually conforms" to the visual characteristics, it need not necessarily perfectly match all visual characteristics of any portion of the baseline information, but instead is modified at least somewhat along the continuum of possible formatting to improve the camouflage effect.

As an extreme example, any original formatting of the replacement information may be completely removed, and the replacement information may be formatted to completely or substantially completely match the formatting of the baseline information. Thus, for example, the replacement information may be analyzed and any images stripped from the replacement information. Further, all or a portion of the line breaks in the original replacement information could be removed. Any other textual characteristics such as font type and size, font color, line height, and text decoration such as bolding, italics, underlines, strikethroughs, shadows, superscripts and subscripts, and the like could be removed from the original replacement information. The replacement information could then be formatted to substantially completely adopt the characteristics of the baseline information or a portion thereof. In such an example, the replacement information could be displayed with apparent line and paragraph breaks matching line and paragraph breaks of a portion of the baseline information.

As may be appreciated, while the extreme example may provide maximum camouflage effect, it may make consumption of the replacement information at least somewhat more difficult. Therefore, lesser formatting of the replacement information may be utilized. Thus, as shown in FIG. 5, the paragraph breaks of the replacement information have been preserved, and textual decoration (specifically bold text) identifying the participants in the chat has been preserved. While the camouflage effect is not as significant in this example, it may be completely adequate for many situations and potentially greatly improves the ease of consuming the replacement information. In the example shown in FIG. 5, if the original replacement information included images, such images have been removed.

In another example, any images of the original replacement information may remain in the camouflaged version, but be altered in some way so as to better conform to the visual characteristics of at least a portion of the baseline information. Thus, the images are still available for consumption, but may appear to be images associated with the baseline information. The images may be changed from color to black-and-white or grayscale images, for example. Alternatively or additionally, the images may be compressed, expanded, or otherwise changed in one or more dimensions or in size. Dynamic content (e.g. video content and the like) may be changed to static content (still images or slowly-changing slideshows). Providing image information in such fashions may be appropriate when the user is less likely to be closely observed and would prefer more-easily consumed replacement information that is closer to the original.

In certain embodiments, the user is able to specify the extent to which the replacement information is camouflaged so as to visually conform to the visual characteristics of the baseline information. The user may also change such settings from time to time as desired, including during consumption of the replacement information. Thus, as the social or other acceptability of consuming the replacement information changes from time to time, the display of the replacement information may be modified to match the then-current social or other acceptability. According to some embodiments, the user may also control a variety of other functions and features, such as by being able to control the placement and size of the region where the replacement information is displayed. The user may also be permitted to designate baseline content and information to be replaced or displaced by the display of the replacement information.

In some instances, completely replacing or displacing baseline information and content with replacement information may not achieve a desirable camouflage effect. For example, if the baseline information includes one or more background images, it may be desirable to maintain and continue to display the background image or images. Thus, in some instances, the display of the replacement information within the region of display may include a blend of the replacement information and the baseline information, such as textual portions of the replacement information and background images of the baseline information. It will be appreciated that the various combinations of baseline information and replacement information may vary to any degree as desired.

As shown in FIGS. 4 and 5, the camouflaging of the replacement information facilitates discreet consumption of the replacement information. Depending on the source and type of the replacement information, the user may wish to receive changing and up-to-date replacement information in real time or near real time. For example, as shown in FIG. 5, the replacement information shown therein includes a chat between two users. Thus, the user may wish to receive replies from each user as they are made, and the replacement information may be updated continuously or from time to time as desired. In some instances, controls, such as scroll bars and the like, may be provided to facilitate consumption of the replacement information. In some instances, the controls may normally be hidden from view until the region containing the camouflaged replacement information is selected, moused over, or otherwise triggered, whereupon the controls become active and viewable.

Where replacement information is capable of change over time, it will be appreciated that the replacement information is representative of content provided by a source. In some embodiments, the source is a data stream such as a data stream delivered by at least intermittent connection to a network. The data stream may be any data stream provided by any service provider. Examples of such data streams include e-mail, social media streams such as those provided by Facebook, Twitter, MySpace, instant messaging clients, and the like, RSS feeds, and notification systems such as Growl. Alternatively, the data stream may be a composite data stream provided by a remote service provider that aggregates multiple data streams from multiple sources and delivers a single composite data stream as the replacement information. Thus, the user may be able to consume information from one or multiple sources through a single camouflaged delivery mechanism.

Figure 6:
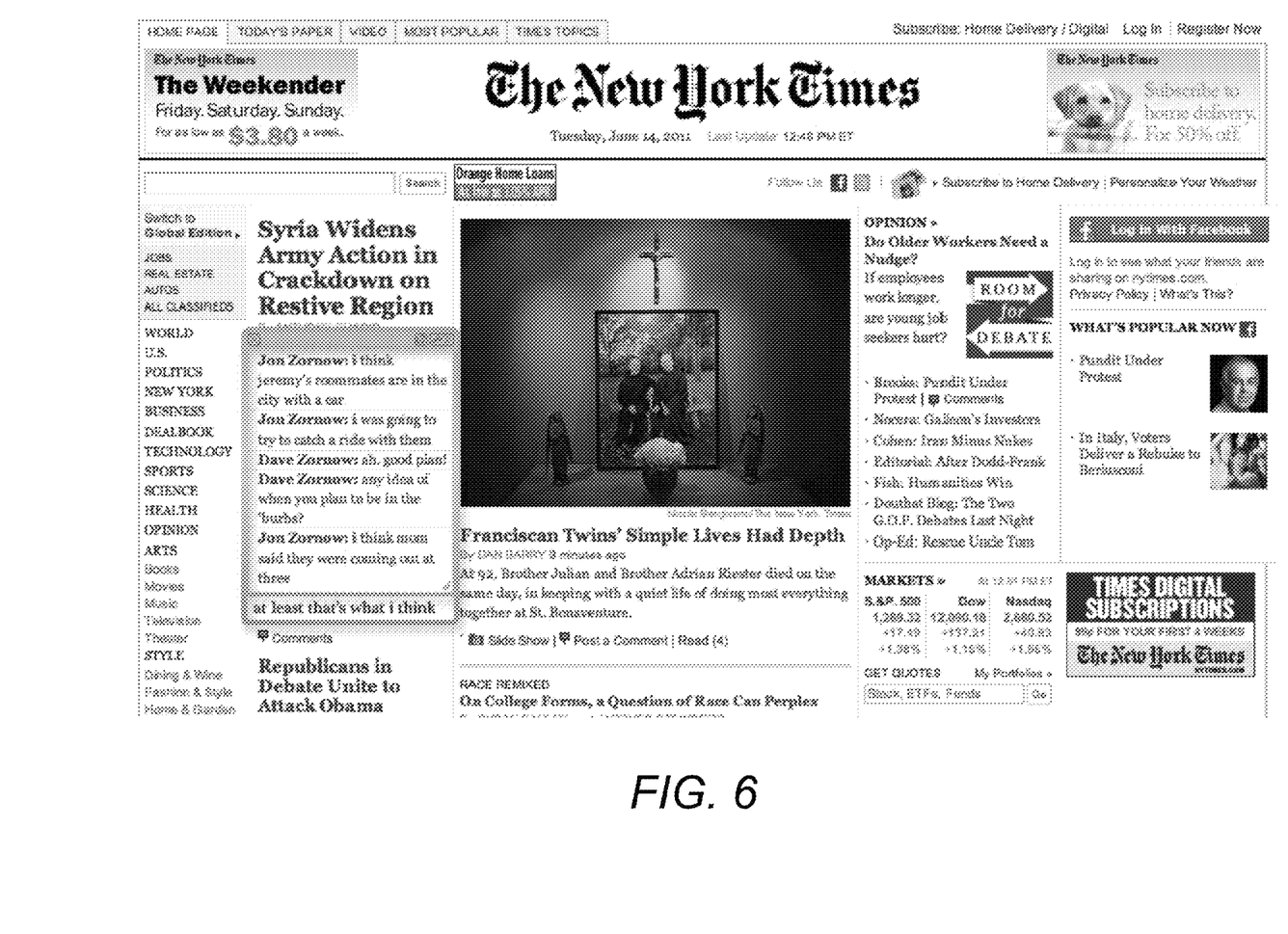
FIG. 6 shows a representative view of information that might be displayed within a content area of a computer program window such as a content area of a web browser screen.
Figure 7:
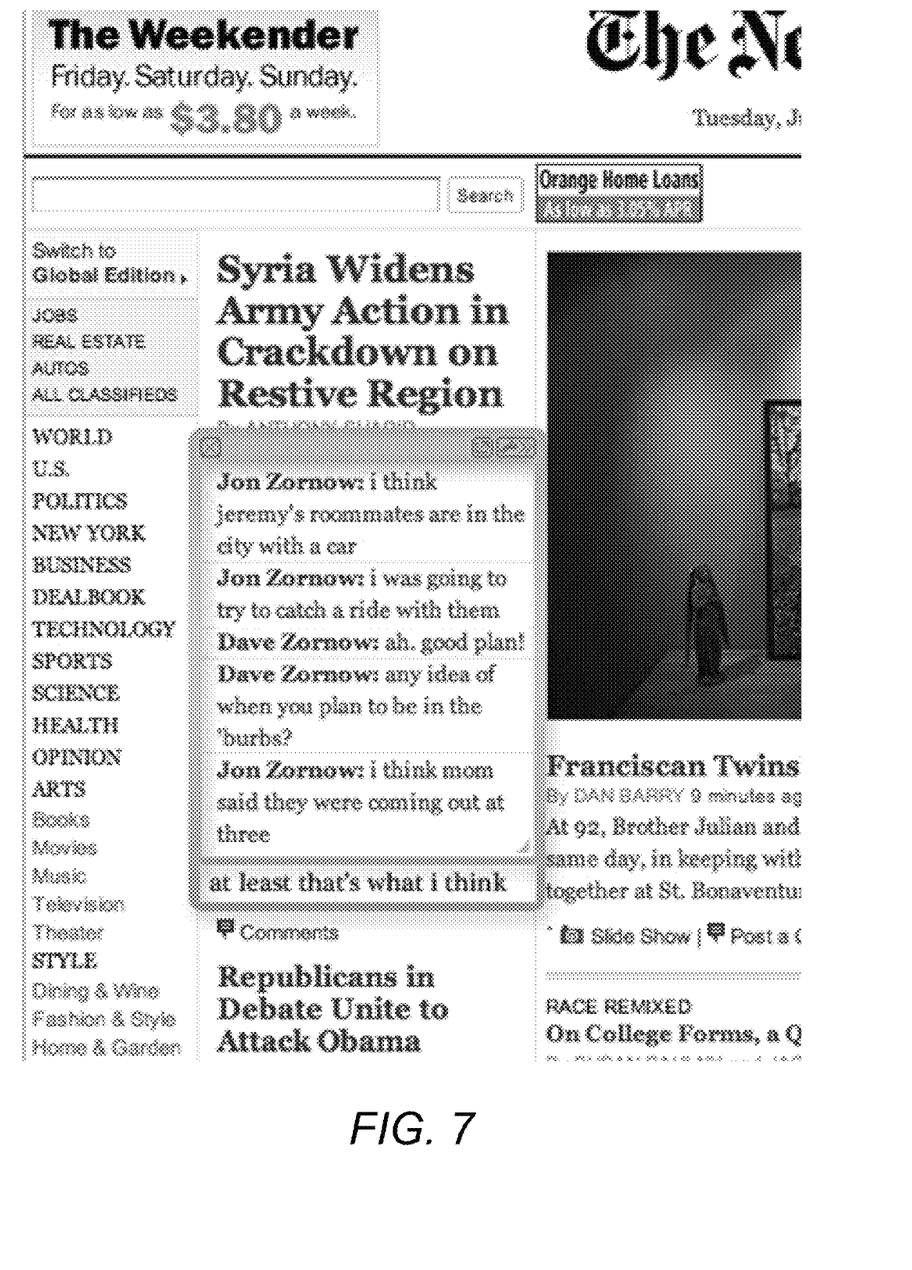
FIG. 7 shows a close-up view of a portion of FIG. 6.

Many users, however, wish to be able to interact with the data stream, such as by replying to messages, chats, and the like. Thus, embodiments of the invention may provide an input interface or an input/output interface within a section of the region of display of the replacement information, such as illustrated in FIGS. 6 and 7. Such an interface may be displayed, for example, upon receipt of a selection of the region of display of the replacement information, upon a mouse-over event of the region of display of the replacement information or a designated portion thereof, or upon some other triggering event. The section where the interface is displayed may encompass the entire region of display of the replacement information, or only a portion thereof.

In the example of FIGS. 6 and 7, the input interface is significantly less camouflaged than the normal display of the region shown in FIGS. 4 and 5. This is exemplary only, and in certain instances, the input interface may be virtually indistinguishable from the normal camouflage condition such that it remains visually conformed to the visual characteristics of the baseline information. Through the input interface, the user is able to interact with the replacement information, the source of the replacement information, and/or the data stream. Such interaction may occur in real time or in near real time, such that an essentially normal interaction that might occur with, for example, the data stream using a standard accessing program or device is available, and other participants in the data stream may not even detect a difference in the user's participation in the data stream.

Where the user wishes and is able to interact with multiple data streams, such as by way of a composite data stream, the system use one of various mechanisms to properly direct the user's interactions to the appropriate data stream or portion of the composite data stream. For example, the system may provide controls so that the user is able to control to which stream his or her interactions are directed. Alternatively, a text string or other keyboard command may accompany input of the user to properly direct the input to the proper stream. As another alternative, a command to direct the input may be received by any other method, such as by way of a certain motion or combination of motions on a touch screen or from a pointing device, or by any combination of mechanisms. In ways such as this, the user may be able to fully yet discreetly interact with even multiple data streams.

Where multiple data streams are combined into a composite data stream, the composite data stream and its components may be selected and configured in advance. This configuration may be done, for example, through a website interface, or through an interface of a local program resident on the computer device. Such an interface may be significantly different than the interface shown in FIGS. 6 and 7, or may be similar, but it is anticipated that the configuration interface need not necessarily be camouflaged. Then, when the user activates the camouflaging program, the multiple data sources will all be delivered through a single camouflaged interface for ease of consumption. Multiple messages, articles, data points can all be displayed in an integrated timeline, and the user can respond and interact with any of this information directly and intelligently, either inline or through a separate response and input area.

While embodiments of the invention as described herein are useful for providing discreet camouflaged access to information, it will be appreciated that embodiments of the invention may also be useful in additional situations, even when camouflage is not necessarily needed. For example, the composite stream configuration discussed above may be used to provide an aggregated information stream to a user such that the user need not separately access each of the sources of information of interest to the user. Additionally, the user may find that he or she benefits from having content from a source or multiple sources in a standardized, desired format. Thus, the user may simply access a service provider website or use a local configuration program to configure a template for optimal aesthetic and organizational impact rather than for camouflage and surreptitious reasons.

While embodiments of the invention have been discussed with respect to incorporation of camouflaged information into the content area 66 of a browser window 50, a camouflaged information stream may be incorporated into a variety of other computer programs. Indeed, in many instances, users may have multiple different computer programs and screens thereof open at any point in time, and may switch between these screens or windows from time to time. The users may wish to maintain access to their information stream regardless of the program being displayed. Thus, in some embodiments, the replacement information may be simultaneously displayed and updated in a region of each of the various computer program screens or windows such that as the user navigates between these different screens or windows, the user always has ready access to the information stream.

Figure 8:
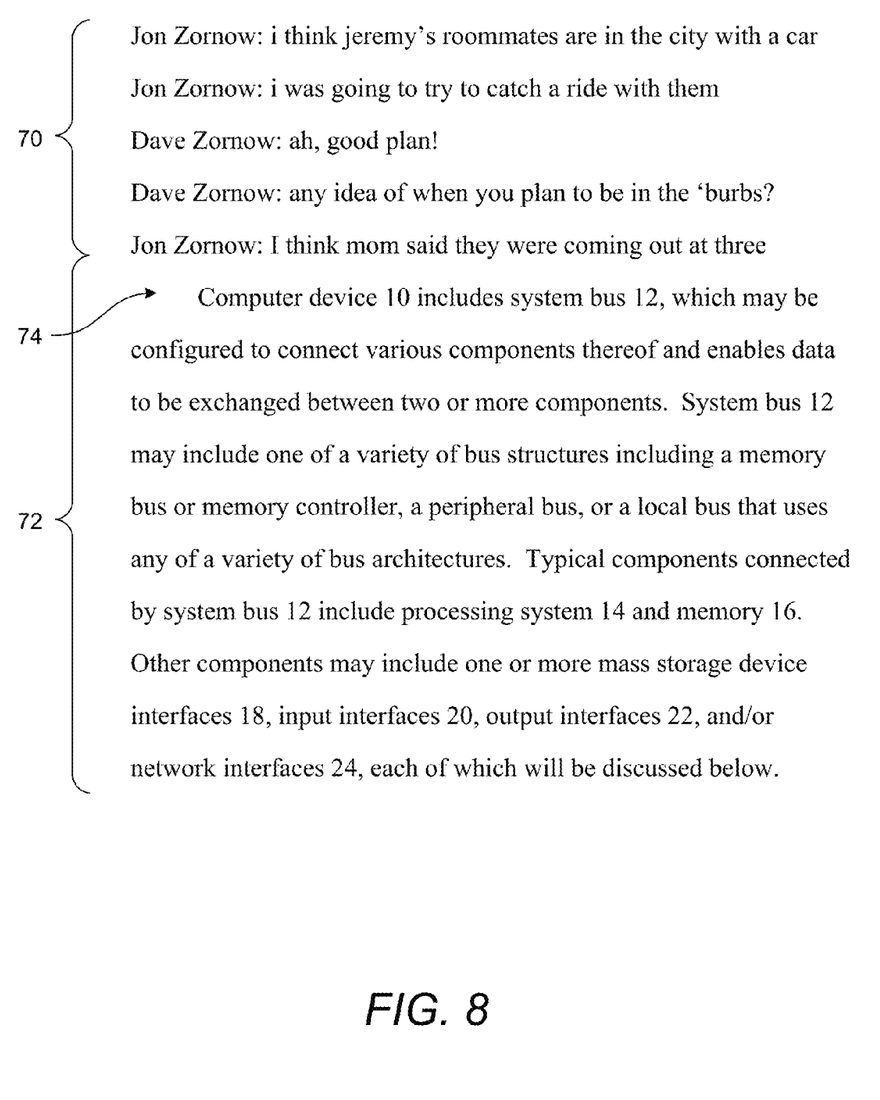
FIG. 8 shows a representative view of information that might be displayed within a content area of a computer program window such as a content area of a word processor screen.
Figure 9:
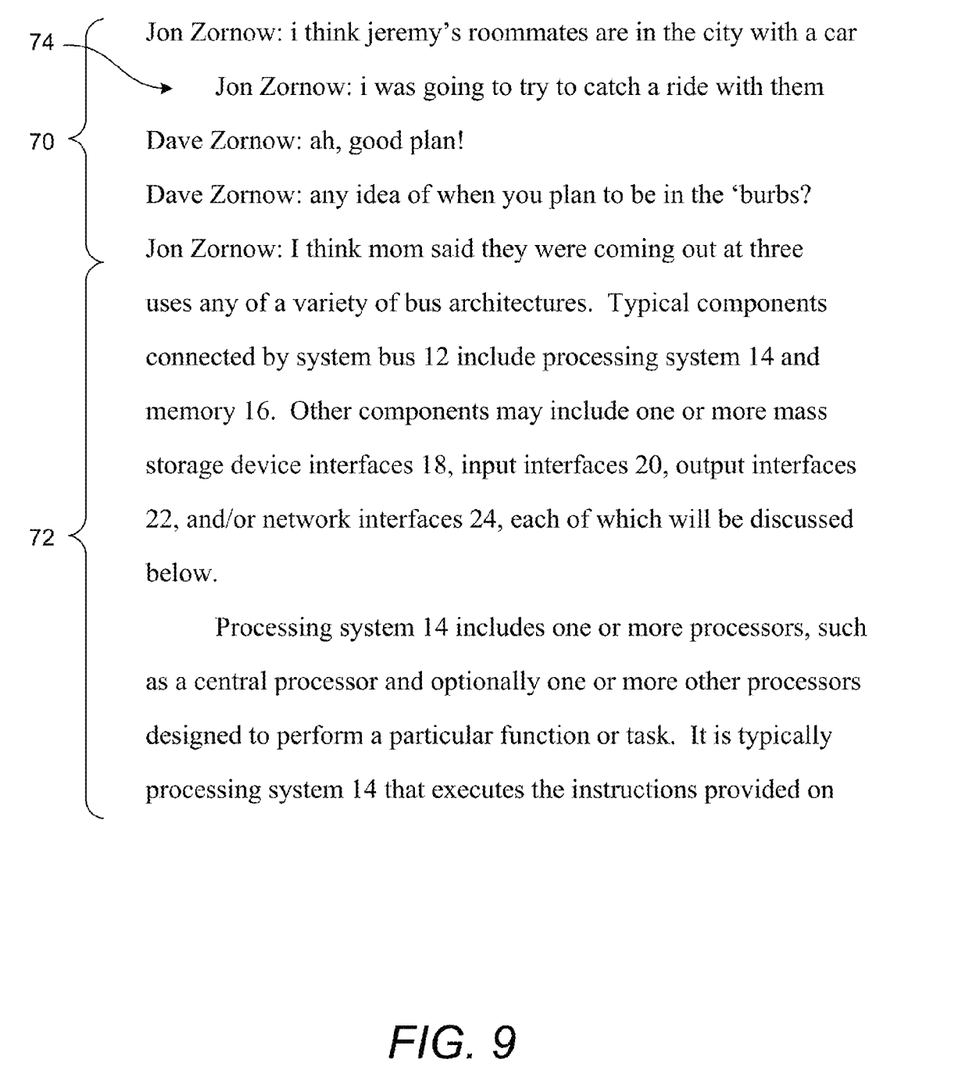
FIG. 9 shows a representative view of information that might be displayed within a content area of a computer program window such as a content area of a word processor screen.

As an example, the user may wish to switch between the browser window 50 and a word processing window. The user may be taking a current events class, and may need to have a news web site open in the browser to refer to a story on the web site, and may also need to have a word processing program open so as to be able to take notes on the instructor's lecture. FIGS. 8 and 9 depict information that might be depicted in the content area of the word processor program during class at the same time that the browser content is as depicted in FIG. 4. As may be seen in FIGS. 8 and 9, the replacement information from the user's information stream may be well camouflaged such that it essentially blends in to the word processor program display.

In the content area of the word processor program, as depicted in FIG. 8, the content area may be divided into two sections: an upper information stream area 70 and a lower word processing area 72. Of course, the content area may be divided differently than depicted in FIG. 8, as desired by the user. When the user types in the word processing area 72, the user's word processor program functions normally, editing the current document. However, when the user types in or otherwise interacts with the information stream area 70, the user's current document is unaffected and instead the user is allowed to interact with his or her information stream, as described above.

It should be noted that in the illustrated example, there is no noticeable division between the information stream area 70 and the word processing area 72. If the user desires, some sort of division, such as a simulated page break, may be provided between the information stream area 70 and the word processing area 72. Regardless, the replacement information in the information stream area 70 is effectively camouflaged in the word processing program, because it is essentially formatted identically with the formatting of the baseline information (e.g. text) in the word processing area 72.

Users of word processing programs who are familiar with the function of such programs will appreciate that as text and additional lines are added to the bottom of the word processing area 72, it will cause the baseline information in the word processing area 72 to scroll upward, causing the uppermost line or lines of the baseline information in the word processing area 72 to become hidden by the replacement information in the information stream area 70. In some embodiments, the camouflage of the information stream will be most effective if the replacement information depicted in the information stream area 70 is modified so as to appear to scroll upward with the baseline information in the word processing area 72. As part of the analysis whereby the replacement information is formatted, the replacement information may be modified to make it appear as if the replacement information is scrolling upward.

For example, a comparison may be made between FIG. 8 and FIG. 9. In FIG. 8, an indentation 74 is depicted as being at the uppermost line of the word processing area 72. As an additional four lines of text are added to the baseline information as depicted in FIG. 9, the indentation 74 would normally move upward four lines (one line at a time), well into the information stream area 72. As illustrated in FIG. 9, the indentation 74 may simply migrate up through the replacement information in the information stream area 70, such that to the casual observer, the word processing program functions essentially as normal. While not illustrated in FIGS. 8 and 9, other modifications may be made to the replacement information to better maintain the camouflage illusion, such as by filling unwanted end-of-line white space with nonsense text, or even by allowing the whitespace to be filled by the baseline information showing from behind the replacement text at locations of white space.

These are merely illustrative examples of ways in which camouflage may be provided in a word processing program. Other mechanisms may be used in such programs, and these or other mechanisms may be used in a spreadsheet program or in any other program where camouflaging of an information stream is desired.

While embodiments of the invention have been discussed with respect to incorporation of camouflaged information into the content area of a browser window or a word processing program, in some embodiments of the invention a printed document is provided which includes baseline and replacement information that has been created by at least one of these systems and methods described herein. Accordingly, a user may camouflage information into the content area of a printed document, wherein the mechanism for creating the electronic document is accomplished by at least one of these systems and methods described above. Following the creation of the digital or electronic document containing the camouflaged information, the user then prints the electronic documents thereby providing print media which includes the camouflaged information. Alternatively, the user may publish or send the electronic document thereby enabling another user to access and print the document to provide the print media.

Figure 10:
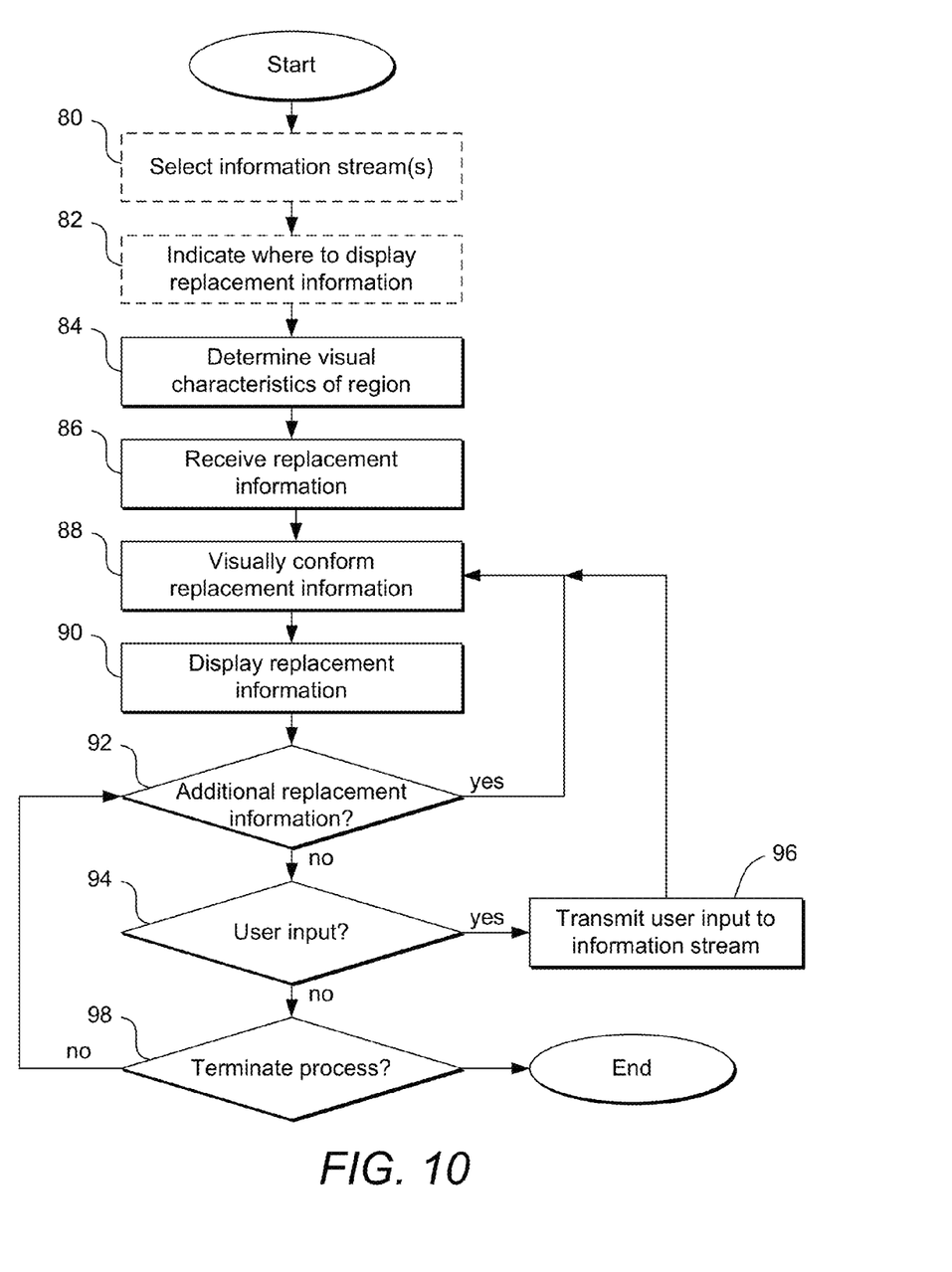
FIG. 10 depicts a flowchart showing representative methods for camouflaging an information stream.

To illustrate methods according to embodiments of the invention, FIG. 10 shows a flow chart illustrating steps in accordance with certain illustrative embodiments of the invention. The steps illustrated in FIG. 8 are intended to be illustrative and representative only, and embodiments of the invention may have more, fewer, and/or different steps than those illustrated in FIG. 8, as set forth in the appended claims.

Execution of the representative process begins at step 80, where a user selects and activates a data source.

Thus, upon initiation of a camouflaged session, the user may select one or more information streams or channels to monitor. Alternatively, this step may have occurred previously, such as through a configuration program, or this step may only occur once or a few times while other steps illustrated herein may occur comparatively more often. At step 82, the user indicates on a target page where the replacement information is to be displayed. This step may be performed automatically in some instances without necessarily requiring user interaction.

The system then analyzes the region where the replacement information is to be displayed at step 84 to determine the visual characteristics of baseline information either within the region, just outside of the region, or both. As discussed above, the visual characteristics analyzed may include a variety of information, such as height and width of the region, placement on the page of the region, font type(s) and size(s), text color(s), line height(s), line spacing(s), margins and padding, background and foreground images, and textual decoration such as bolding, italics, underlining, overlining, strikethroughs, shadows, subscripts, superscripts, and the like.

At step 86, the system receives replacement information from, for example, the user-selected information stream. Until such time as the system receives sufficient replacement information to fill the designated region, the system may continue displaying the baseline information or a portion thereof unchanged, such that there is no sudden, noticeable change in the designated region perceptible to the casual observer. Once the system receives the replacement information, the replacement information is visually conformed to the visual characteristics determined at step 84 to a greater or lesser extent to achieve the desired camouflage and/or aesthetic and organizational effect, as discussed above. Different portions of the replacement information may be conformed differently to visually conform to different visual characteristics at different locations within the region, and the formatting of the replacement information may be modified from time to time to conform to the changing locations of each portion of the replacement information as the information stream is updated from time to time, or as any replaced baseline information is detected to be updated or changed from time to time.

At step 90, the replacement information, as visually conformed to the visible characteristics, is displayed on the electronic display, where it can be viewed by the user. At decision block 92, a determination is made as to whether additional replacement information (e.g. from the selected information stream) is available. If yes, execution loops back to step 88 (although step 84 may continue to occur continuously if needed) and execution proceeds as described above. If not, execution proceeds to decision block 94, where a determination is made as to whether user input for the information stream (or one of them) has been received.

If user input for the information stream (or one of them) has been received, the information is transmitted to the appropriate information stream at step 96. As the user input is also essentially additional replacement information, execution loops back to step 88 for conforming the user input to the visual characteristics and displaying the user input at step 90 as discussed above.

If, however, no user input has been received, execution proceeds to decision block 98, where a determination is made as to whether to terminate the process. As long as the process is to continue, execution loops back to decision block 92 as shown. Otherwise, the process ends until the next time that the user uses the camouflage program and system to discreetly access one or more information streams.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method for camouflaging an input interface and information within an electronic display, the method comprising steps for:
    generating a document on the electronic display, the document comprising baseline information having visual characteristics;
    automatically analyzing, using a computer device, the visual characteristics of the baseline information displayed on the electronic display;
    generating an input interface within the document, wherein the input interface visually conforms to the visual characteristics of the baseline information in proximity to the location of the input interface within the document, wherein the input interface is visually indistinguishable from the proximal baseline information;
    generating information that visually conforms to the visual characteristics of the proximal baseline information, wherein the information is visually indistinguishable from the proximal baseline information; and
    automatically inserting the information within the input interface.

2. A method as recited in claim 1, wherein the electronic display comprise two or more documents, each document comprising baseline information, the baseline information of each document further comprising one or more input interfaces and information that visually conforms to the visual characteristics of the baseline information in proximity to the one or more input interfaces and information.

3. A method as recited in claim 1, further comprising a step for automatically formatting the information to visually conform to the proximal baseline information.

4. A method as recited in claim 3, wherein automatically formatting the information comprises formatting at least one textual element selected from the group of font type and size;
    font color;
    line height;
    margins and padding; and
    textual decoration.

5. A method as recited in claim 1, wherein the step of automatically formatting the information comprises altering visual characteristics of an image portion of the information.

6. A method as recited in claim 1, wherein the input interface permits a user of the computer device to interact with the information in real-time.

7. A method as recited in claim 6, wherein the input interface is visually distinguishable from the proximal baseline information upon the user hovering a cursor of the computer device over the input interface.

8. A method as recited in claim 7, wherein the input interface is visually indistinguishable from the proximal baseline information when the cursor of the computer device is hovered over the proximal.

9. A method as recited in claim 1, further comprising:
receiving from a user of the computer device a designation of a region within the baseline information of the discrete document for placement of the input interface; and
receiving from the user a designation of an extent to which the information is to be automatically formatted to the visual characteristics of the proximal baseline information, wherein the information is automatically formatted to the visual characteristics of the proximal baseline information to the extent designated by the user.

10. A method as recited in claim 1, further comprising a step for causing the electronic display to display the information within the input interface within the document, wherein the electronic display generates and displays a blend of the information and the proximal baseline information document to appear as a single document.

11. A method as recited in claim 1, wherein the information comprises a real-time data stream delivered to the computer device over a network via a data stream.

12. A method as recited in claim 11, wherein the information is updated in real-time based upon changes in the data stream.

13. A non-transitory computer-readable medium storing computer program instructions for implementing a method for camouflaging discrete information for display by an electronic display, the method comprising:
automatically analyzing, using a computer device, visual characteristics of baseline information of a document designated to be displayed on a portion of the electronic display;
generating an input interface within the document, wherein the input interface visually conforms to the visual characteristics of the baseline information in proximity to the location of the input interface within the document, wherein the input interface is visually indistinguishable from the proximal baseline information
generating information within the input interface; and
causing the electronic display to temporarily display the information within the input interface of the document, the information visually conforming to the visual characteristics of the proximal baseline information so as to be visually indistinguishable from the proximal baseline information of the document.

14. A computer-readable medium method as recited in claim 13, the method further comprising a step for automatically formatting the information to visually conform to the visual characteristics.

15. A computer-readable medium as recited in claim 13, wherein the information is obtained from a real-time data stream delivered over a network and wherein the method further comprises a step for permitting a user to interact with and add additional information to the input interface in real-time.

16. A method as recited in claim 15, wherein the input interface conforms to the visual characteristics of the proximal baseline information.

* * * * *